(12) United States Patent
Shirani-Mehr et al.

(10) Patent No.: US 10,224,764 B2
(45) Date of Patent: Mar. 5, 2019

(54) WIRELESS LINK MANAGEMENT TECHNIQUES FOR WIRELESS CHARGING SYSTEMS

(71) Applicant: INTEL CORPORATION, Santa Clara, CA (US)

(72) Inventors: Hooman Shirani-Mehr, Portland, OR (US); Ahmad Khoshnevis, Portland, OR (US); Yongwei Wu, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 263 days.

(21) Appl. No.: 15/199,811

(22) Filed: Jun. 30, 2016

(65) Prior Publication Data

US 2017/0229925 A1 Aug. 10, 2017

Related U.S. Application Data

(60) Provisional application No. 62/292,035, filed on Feb. 5, 2016.

(51) Int. Cl.

| | |
|---|---|
| *H01F 27/42* | (2006.01) |
| *H01F 37/00* | (2006.01) |
| *H01F 38/00* | (2006.01) |
| *H02J 50/80* | (2016.01) |
| *H02J 7/02* | (2016.01) |
| *H02J 50/12* | (2016.01) |
| *H04W 76/30* | (2018.01) |
| *H04W 76/14* | (2018.01) |
| *H04W 76/38* | (2018.01) |

(52) U.S. Cl.
CPC .............. *H02J 50/80* (2016.02); *H02J 7/025* (2013.01); *H02J 50/12* (2016.02); *H04W 76/30* (2018.02); *H04W 76/14* (2018.02); *H04W 76/38* (2018.02)

(58) Field of Classification Search
CPC ............ H02J 50/80; H02J 50/12; H02J 7/025; H04W 76/30; H04W 76/38; H04W 76/14
USPC .......................................................... 307/104
See application file for complete search history.

(56) References Cited

U.S. PATENT DOCUMENTS

| | | |
|---|---|---|
| 2014/0091626 A1 | 4/2014 | Walley et al. |
| 2014/0113689 A1 | 4/2014 | Lee |
| 2014/0285141 A1 | 9/2014 | Lee et al. |
| 2014/0306657 A1 | 10/2014 | Lundgren et al. |

(Continued)

OTHER PUBLICATIONS

International Search Report and Written Opinion received for PCT Patent Application No. PCT/US2017/016738, dated May 15, 2017, 10 pages.

*Primary Examiner* — Carlos D Amaya

(57) ABSTRACT

Wireless link management techniques for wireless charging systems are described. According to some such techniques, a power receiving unit (PRU) may be configured to observe a rectifier voltage while operating in a charge complete connected (CCC) mode according to which it possesses a wireless connection with a power transmitting unit (PTU) operating in a power save state. In various embodiments, the PRU may be configured to observe the rectifier voltage in an attempt to detect power beacons generated by the PTU. In some embodiments, the PRU may be configured to maintain the wireless connection if it detects power beacons, and to terminate the wireless connection if it does not detect any beacons. Other embodiments are described and claimed.

13 Claims, 9 Drawing Sheets

(56) References Cited

U.S. PATENT DOCUMENTS

2015/0215006 A1* 7/2015 Mehas ................ H04B 5/0037
  307/104
2015/0372496 A1 12/2015 Lee et al.

* cited by examiner

*400*

WIRELESS LINK MANAGEMENT TECHNIQUES FOR WIRELESS CHARGING SYSTEMS

RELATED CASE

This application claims priority to U.S. Provisional Patent Application No. 62/292,035, filed Feb. 5, 2016, the entirety of which is hereby incorporated by reference.

TECHNICAL FIELD

Embodiments described herein generally relate to wireless power transfer systems.

BACKGROUND

In a wireless power transfer system, a power transmitting unit (PTU) may be capable of wirelessly transferring power to compatible devices that are located within a transfer field of that PTU. In order to effect power transfer, the PTU may apply current to a resonator coil, which may transfer power to one or more power receiving units (PRUs) via resonant inductive coupling with resonator coils of those PRUs.

DETAILED DESCRIPTION

Figure 1:
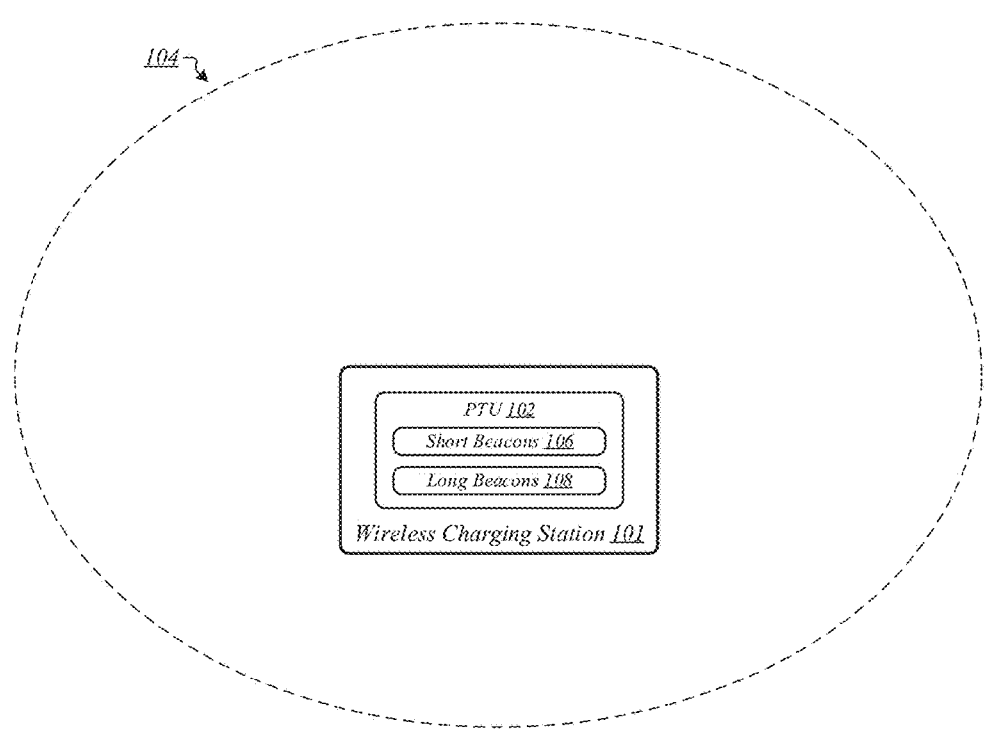
FIG. 1 illustrates an embodiment of a first operating environment.

Various embodiments may be generally directed to wireless link management techniques for wireless charging systems. According to some such techniques, a power receiving unit (PRU) may be configured to observe a rectifier voltage while operating in a charge complete connected (CCC) mode according to which it possesses a wireless connection with a power transmitting unit (PTU) operating in a power save state. In various embodiments, the PRU may be configured to observe the rectifier voltage in an attempt to detect power beacons generated by the PTU. In some embodiments, the PRU may be configured to maintain the wireless connection if it detects power beacons, and to terminate the wireless connection if it does not detect any beacons. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Embodiments herein are generally directed to wireless power transfer systems. Various embodiments may involve wireless power transfers performed according to one or more wireless power transfer standards. Wireless power transfer technologies and/or standards that may be used in some embodiments may include, for example, Rezence standards promulgated by the Alliance for Wireless Power, Qi standards promulgated by the Wireless Power Consortium, and the Power 2.0 standard promulgated by the Power Matters Alliance. Additional examples of wireless power transfer technologies and/or standards that may be used in some embodiments may include technologies and/or standards that may be promulgated by the organization formed by the 2015 merger of the Alliance for Wireless Power and the Power Matters Alliance. The embodiments are not limited to these examples.

Various embodiments may involve wireless communications performed according to one or more wireless communications standards. For example, some embodiments may involve wireless communications in Bluetooth Low Energy (also known as Bluetooth Smart) wireless networks according to Bluetooth Core Specification 4.2, released December 2014, and/or any predecessors, progeny, and/or variants thereof. Additional examples of wireless communications technologies and/or standards that may be used in various embodiments may include—without limitation—IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11 ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit ("WiGig"), WiGig Display Extension (WDE), WiGig Bus Extension (WBE), WiGig Serial Extension (WSE) standards and/or standards developed by the WFA Neighbor Awareness Networking (NAN) Task Group. Some embodiments may involve wireless communications performed according to one or more next-generation 60 GHz ("NG60") wireless local area network (WLAN) communications standards and/or one or more millimeter-wave (mmWave) wireless communication standards.

Various embodiments may involve wireless communications performed according to one or more broadband wireless communications standards. For example, some embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Additional examples of broadband wireless communication technologies/standards that may be utilized in various embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants. Further examples of wireless communications technologies and/or standards that may be used in some embodiments may include—without limitation—machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above.

FIG. 1 illustrates an example of an operating environment 100 that may be representative of various embodiments. In operating environment 100, a wireless charging station 101 comprises a power transmitting unit (PTU) 102, which may be operable to wirelessly transfer power to capable devices within a transfer region 104. In some embodiments, PTU 102 may be operable to wirelessly transfer power to capable devices within transfer region 104 via resonant inductive coupling, using a transmit resonator. It is worthy of note that the size and shape of transfer region 104—as well as its position and orientation relative to wireless charging station 101 and PTU 102—may vary from embodiment to embodiment, and are not limited to the example depicted in FIG. 1.

In various embodiments, PTU 102 may be configured to operate in a power save state when there are no devices requiring wireless charging within transfer region 104. In some embodiments, while operating in the power save state, PTU 102 may periodically generate short beacons 106 in order to detect the presence of wirelessly-chargeable devices within transfer region 104. In various embodiments, PTU 102 may detect the presence of a new device based on a change in the impedance upon the transmit resonator. In some embodiments, while operating in the power save state, PTU 102 may periodically generate long beacons 108 in order to enable devices that may be present within transfer region 104 to identify themselves to PTU 102. In various embodiments, any given long beacon 108 may enable such a device to power on for a period of time long enough to transmit an advertisement to PTU 102. The embodiments are not limited in this context.

Figure 2:
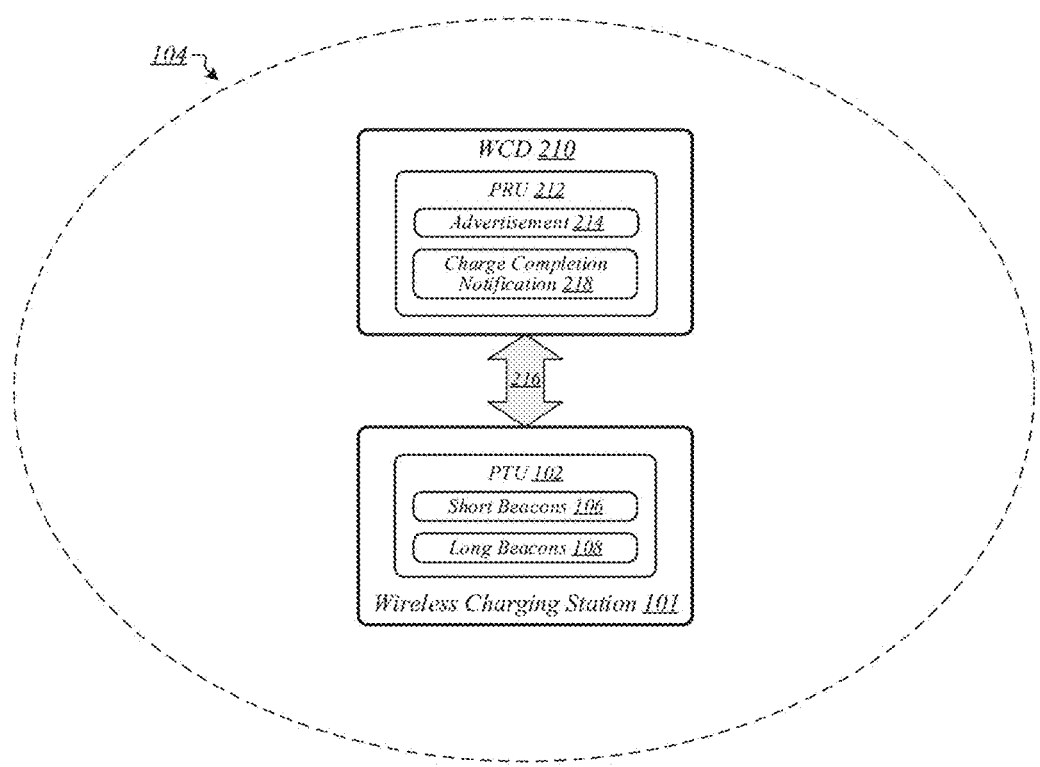
FIG. 2 illustrates an embodiment of a second operating environment.

FIG. 2 illustrates an example of an operating environment 200 that may be representative of some embodiments. In operating environment 200, a wirelessly-chargeable device (WCD) 210 is present within transfer region 104, and comprises a power receiving unit (PRU) 212. In this example, WCD 210 is the only wirelessly-chargeable device present within transfer region 104. In various embodiments, a long beacon 108 generated by PTU 102 may provide PRU 212 with enough power to enable PRU 212 to transmit an advertisement 214 to PTU 102. In some embodiments, in response to advertisement 214, PTU 102 may transmit a connection request message to PRU 212, and a wireless communication connection 216 may be established between PTU 102 and PRU 212. In various embodiments, wireless communication connection 216 may comprise a Bluetooth Low Energy (BLE) connection. The embodiments are not limited in this context.

In some embodiments, if a battery of WCD 210 needs to be charged, PRU 212 may communicate with PTU 102 via wireless communication connection 216 in order to request wireless power transfer. In various embodiments, in order to wirelessly transfer power to PRU 212, PTU 102 may operate in a power transfer state. In some embodiments, PRU 212 may wirelessly receive power from PTU 102 via resonant inductive coupling, using a receive resonator. In various embodiments, once the battery is fully charged, PRU 212 may transmit a charge completion notification 218 to PTU 102 via wireless communication connection 216 in order to notify PTU 102 that wireless power transfer is no longer required. In some embodiments, PRU 212 may send charge completion notification 218 to PTU 102 by setting a Charge Complete bit in a PRU Dynamic Parameter Characteristic or PRU Alert to a value of 1. In various embodiments, in response to receipt of charge completion notification 218—and in view of the fact that WCD 210 is the only wirelessly-chargeable device located within transfer region 104—PTU 102 may determine that there are no longer any devices requiring wireless charging within transfer region 104. In some embodiments, in response to this determination, PTU 102 may transition from the power transfer state to the power save state.

In various embodiments, PRU 212 may be capable of operating in a Charge Complete Disconnected (CCD) mode. In some embodiments, according to the CCD mode (or "CCCD"), when PTU 102 transitions to the power save state, wireless communication connection 216 may be terminated. In various embodiments, PRU 212 may be capable of operating in a Charge Complete Connected (CCC) mode. In some embodiments, while PRU 212 operates in the CCC mode (or "CCCM"), the wireless communication connection 216 between PTU 102 and PRU 212 may be maintained. In various embodiments, PRU 212 may be configured to use battery power or power from some other source in order to engage in wireless communications with PTU 102 via wireless communication connection 216 while operating in the CCC mode. In some embodiments in which PRU 212 is capable of operating in CCC mode, it may notify PTU 102 of this capability by setting a corresponding bit in a PRU Information bit field of a PRU Static Characteristic. The embodiments are not limited in this context.

Figure 3:
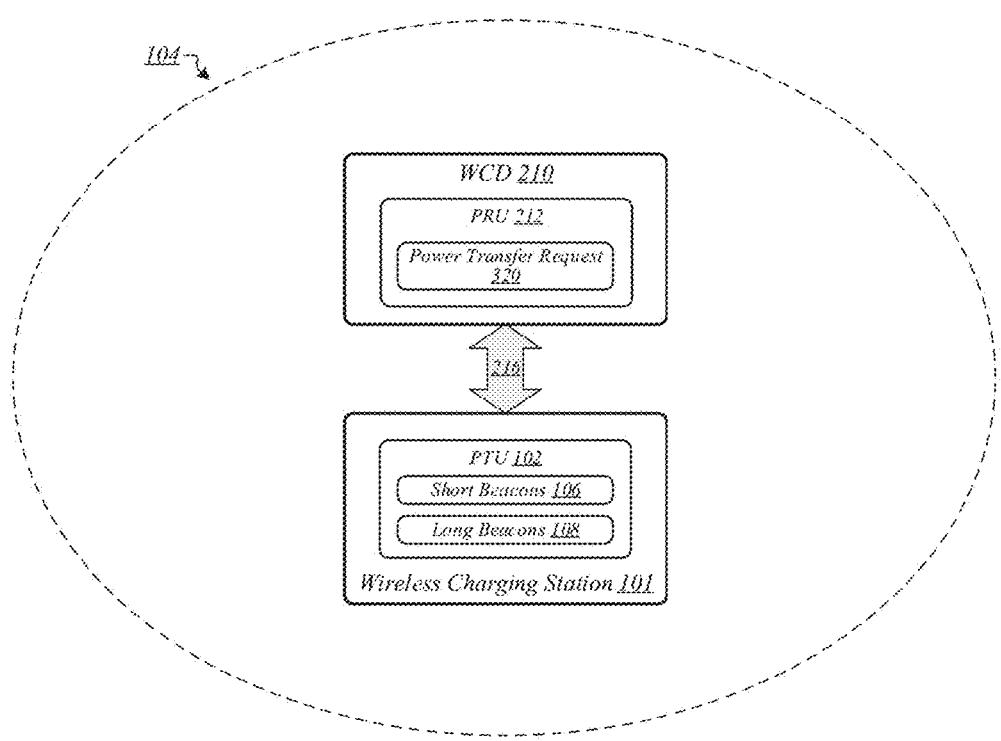
FIG. 3 illustrates an embodiment of a third operating environment.

FIG. 3 illustrates an example of an operating environment 300 that may be representative of various embodiments. In operating environment 300, while operating in the CCC mode, PRU 212 may determine that it once again needs to charge the battery of WCD 210. In some embodiments, PRU 212 may be able to notify PTU 102 of its need for wireless power transfer by sending a power transfer request 320 to PTU 102 via wireless communication connection 216. In various embodiments, PRU 212 may be able to send power transfer request 320 by transmitting a PRU Dynamic Parameter Characteristic or PRU Alert in which it sets a Charge Complete bit to a value of 0. The embodiments are not limited in this context.

In some embodiments, PRU 212 may be configured to monitor a rectifier voltage $V_{RECT}$ while PRU 212 is capable of providing its own power and has an established wireless communication link—such as wireless communication connection 216—with PTU 102. In various embodiments, PRU 212 may be configured to initiate a connection termination procedure when $V_{RECT}$ is found to be less than an undervoltage lockout value $V_{RECT\_UVLO}$. In some embodiments, the connection termination procedure may comprise a Generic Access Profile (GAP) Terminate Connection procedure. In various embodiments, PRU 212 may be configured to initiate the connection termination procedure within a defined amount of time $T_{RECT}$ following a determination that $V_{RECT}$ has dropped below $V_{RECT\_UVLO}$. In some embodiments, $T_{RECT}$ may be equal to 500 ms. In various embodiments, this defined amount of time may be significantly shorter than the time intervals between long beacons 108. In some embodiments, for example, $T_{RECT}$ may be equal to 500 ms, and long beacons 108 may be generated at 1000-3000 ms intervals. In various such embodiments, according to conventional techniques, it may be likely that the 500 ms interval elapses and PRU 212 is forced to perform the connection termination procedure, resulting in undesired termination of wireless communication connection 216.

Disclosed herein are wireless link management techniques that may be implemented in some embodiments in order to address this problem. According to various such techniques, a PRU may be configured to observe a rectifier voltage while operating in a CCC mode according to which it possesses a wireless connection with a PTU operating in a power save state. In some embodiments, the PRU may be configured to observe the rectifier voltage in an attempt to detect beacons generated by the PTU. In various embodiments, the PRU may be configured to maintain the wireless connection if it detects beacons, and to terminate the wireless connection if it does not detect any beacons. Other embodiments are described and claimed.

Figure 4:
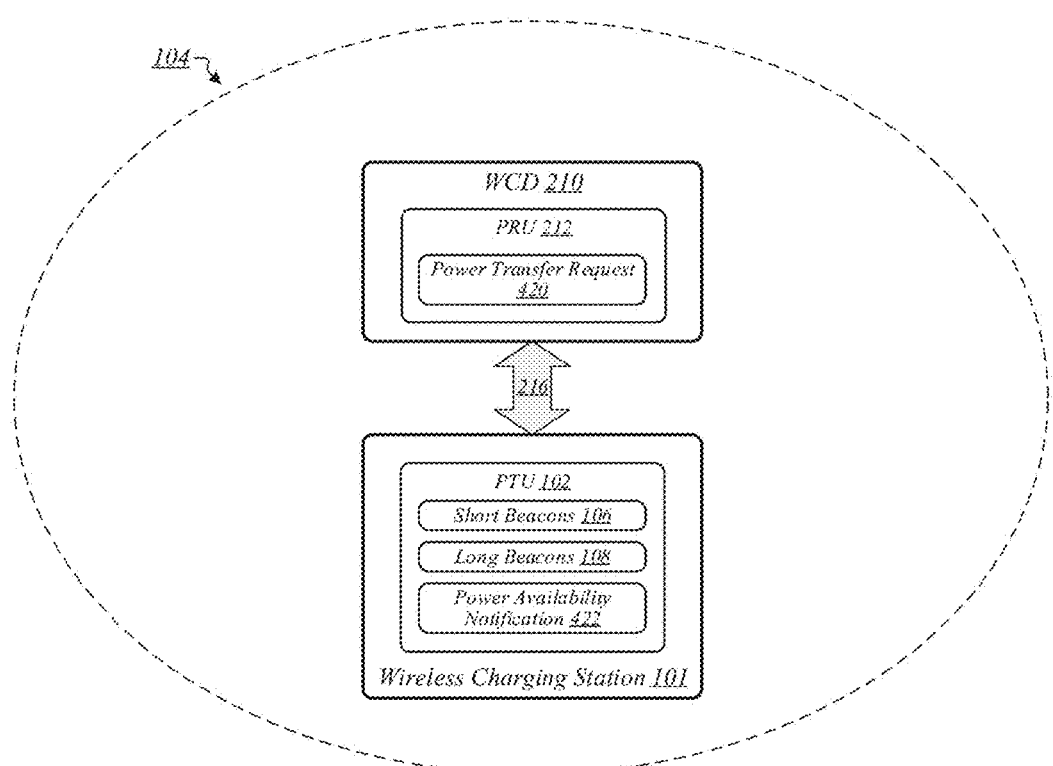
FIG. 4 illustrates an embodiment of a fourth operating environment.

FIG. 4 illustrates an example of an operating environment 400 that may be representative of the implementation of one or more of the disclosed wireless link management techniques according to some embodiments. In operating environment 400, while PTU 102 operates in the power save state and PRU 212 operates in the CCC mode, PRU 212 may monitor $V_{RECT}$ in an attempt to detect short beacons 106 and/or long beacons 108 generated by PTU 102. In various embodiments, if PRU 212 detects any short beacons 106 and/or long beacons 108, PRU 212 may conclude that it is within transfer region 104 and may maintain wireless communication connection 216. In some embodiments, if PRU 212 does not detect any short beacon 106 or long beacon 108, it may conclude that it has been removed from transfer region 104 and may initiate a connection termination procedure, such as a GAP Terminate Connection procedure. The embodiments are not limited in this context.

In various embodiments, PRU 212 may monitor $V_{RECT}$ in a time interval which is at least x ms long, for example x=1110 ms, or x=3110 ms. In general, the time interval for monitoring and sampling may be selected so as to be long enough to result in a reliable detection. In some embodiments, 5 ms sampling and monitoring every 95 ms may be implemented in order to achieve reliable detection of long beacons 108. The embodiments are not limited to this example.

In various embodiments, following a determination that it needs to charge the battery of WCD 210, PRU 212 may send a power transfer request 420 to PTU 102 and start a timer. In some embodiments, PRU 212 may send power transfer request 420 by setting the Charge Complete bit within a PRU Dynamic Parameter Characteristic or PRU Alert to a value of 0. In various embodiments, the timer may be used to implement a wait interval. In some embodiments, the wait interval may comprise 0.5 seconds or 1 second. The embodiments are not limited to these examples.

In various embodiments, in response to power transfer request 420, PTU 102 may determine whether it can provide power to PRU 212. In some embodiments, in response to a determination that it can provide power to PRU 212, PTU 102 may transition to a power transfer state and enable a charge port, and may transmit a power availability notification 422 to PRU 212. In various embodiments, PTU 102 may send power availability notification 422 to PRU 212 by setting PRU Charge Port to a value of 1 and setting a Permission field to '0000 0000' in a PRU Control message that it transmits to PRU 212. In some embodiments, in response to a determination that it cannot provide power to PRU 212, PTU 102 may stay in the power save state, and may not enable the charge port. The embodiments are not limited in this context.

In various embodiments, if PRU 212 receives a power availability notification such as power availability notification 422 prior to expiration of the wait interval, PRU 212 may maintain wireless communication connection 216 and transition to an on state. In some embodiments, if PRU 212 does not receive a power availability notification prior to expiration of the wait interval, PRU 212 may initiate the connection termination procedure. The embodiments are not limited in this context.

In various embodiments, in order to support the implementation of one or more of the disclosed techniques, an A4WP base service specification (BSS) may be modified to incorporate a table such as Table 1 below. The embodiments are not limited in this context.

TABLE 1

Charge start from PTU power save for PRU with CCCM

| Origin state | Destination state | Required or optional | Additional required conditions | Exceptions |
| --- | --- | --- | --- | --- |
| PTU Power Save | PTU Power Transfer | Required | 0 System errors and Bit Field for Permission equal to '0000 0000' PRU alert or PRU dynamic parameter characteristic with CC = 0 | None |

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
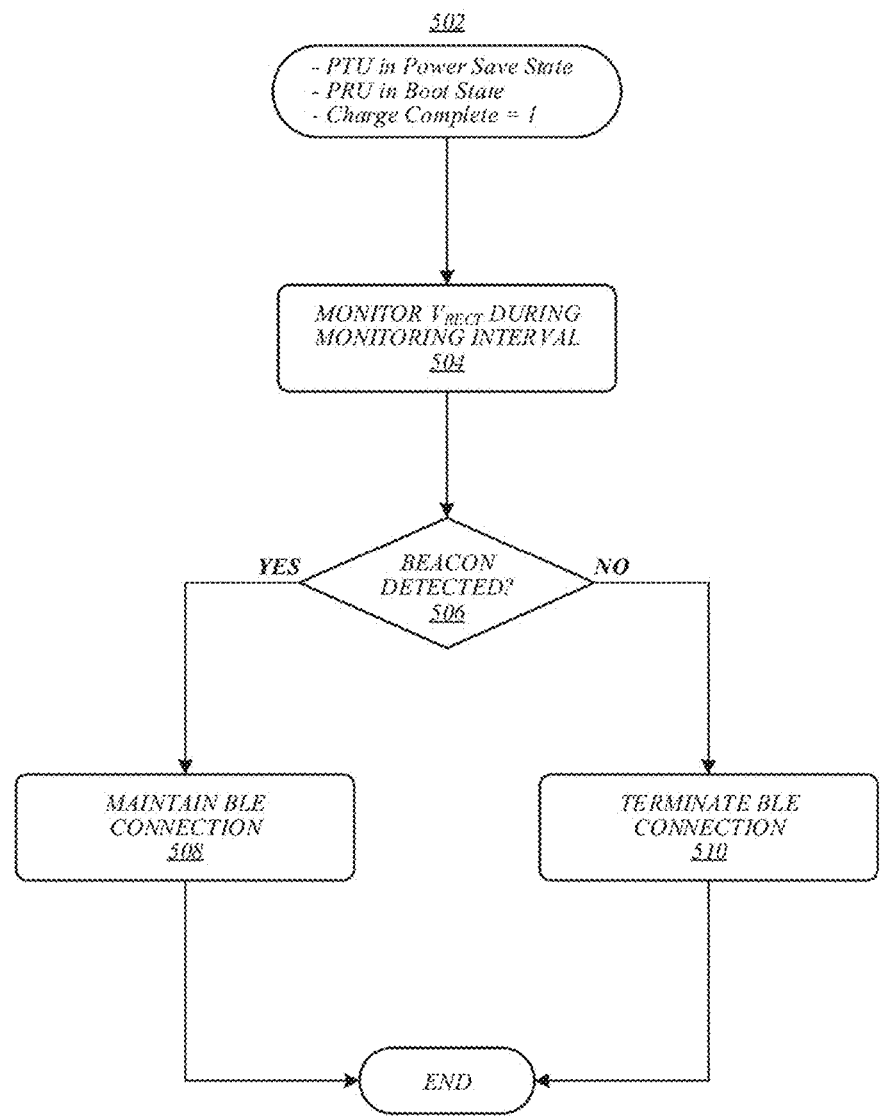
FIG. 5 illustrates an embodiment of a first logic flow.

FIG. 5 illustrates an example of a logic flow 500 that may be representative of the implementation of one or more of the disclosed wireless link management techniques according to some embodiments. As shown in FIG. 5, logic flow 500 may begin at 502. At 502, a PTU may operative in a power save state, a PRU possessing a BLE connection to the PTU may operate in a boot state, and a Charge Complete bit associated with the PRU may be set to 1. At 504, a $V_{RECT}$ of the PRU may be monitored during a monitoring interval. Flow may then proceed from 506 depending on whether monitoring of the $V_{RECT}$ resulted in the detection of a beacon. If a beacon has been detected, flow may pass to 508, where the BLE connection may be maintained. If no beacon has been detected, flow may pass from 506 to 510, where the BLE connection may be terminated. Following either 508 or 510, the logic flow may end.

Figure 6:
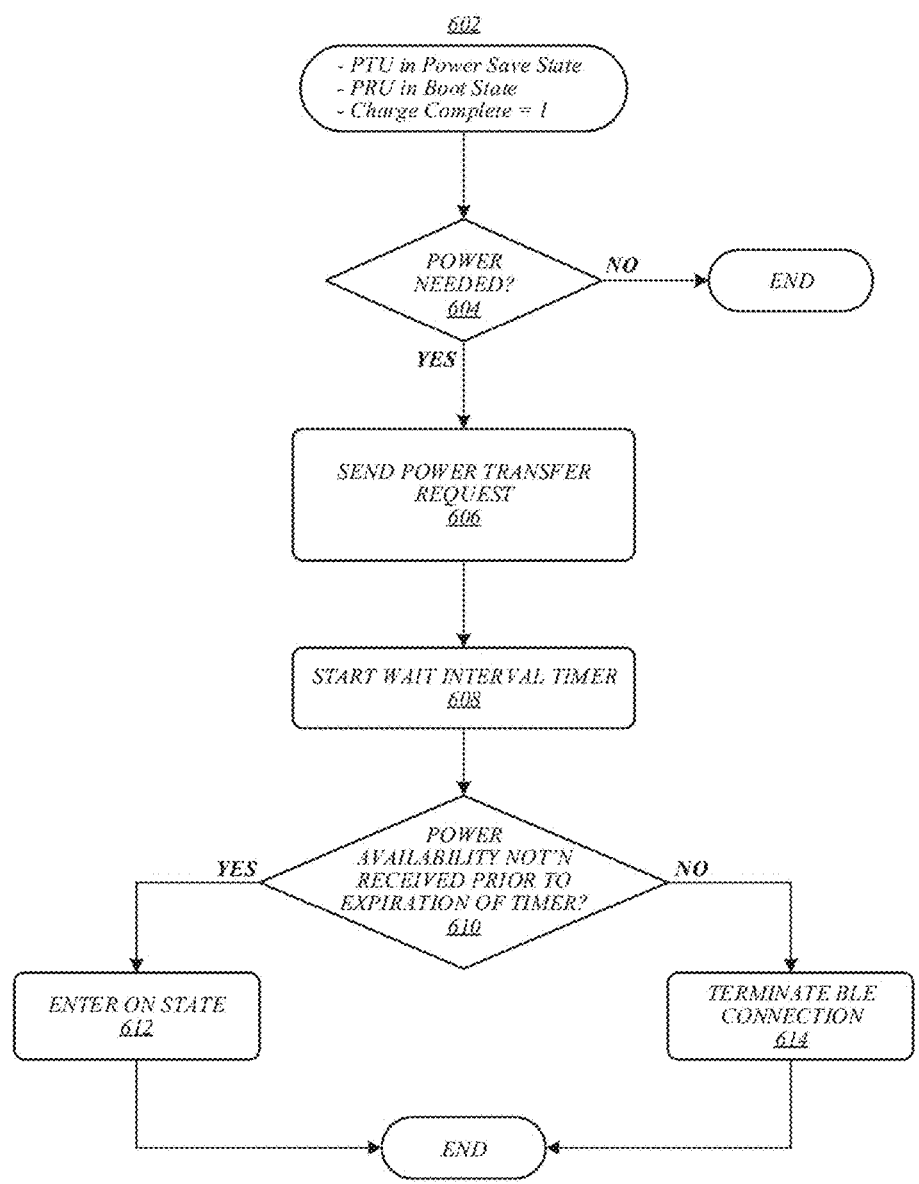
FIG. 6 illustrates an embodiment of a second logic flow.

FIG. 6 illustrates an example of a logic flow 600 that may be representative of the implementation of one or more of the disclosed wireless link management techniques according to some embodiments. As shown in FIG. 6, logic flow 600 may begin at 602. At 602, a PTU may operative in a power save state, a PRU possessing a BLE connection to the PTU may operate in a boot state, and a Charge Complete bit associated with the PRU may be set to 1. At 604, it may be determined whether power is required at the PRU. If it is determined that power is not required at the PRU, the logic flow may end. If it is determined that power is required at the PRU, flow may pass to 606.

At 606, a power transfer request may be sent to the PTU. In some embodiments, the power transfer request may be sent by setting the Charge Complete bit to a value of 0. At 608 a timer may be started in order to implement a wait interval. Flow may then proceed from 610 based on whether a power availability notification is received prior to expiration of the timer. If a power availability notification is received prior to expiration of the timer, the BLE connection may be maintained, and the PRU may transition to an on state. If no power availability notification is received prior to expiration of the timer, the BLE connection may be terminated. Following either 612 or 614, the logic flow may end.

Figure 7:
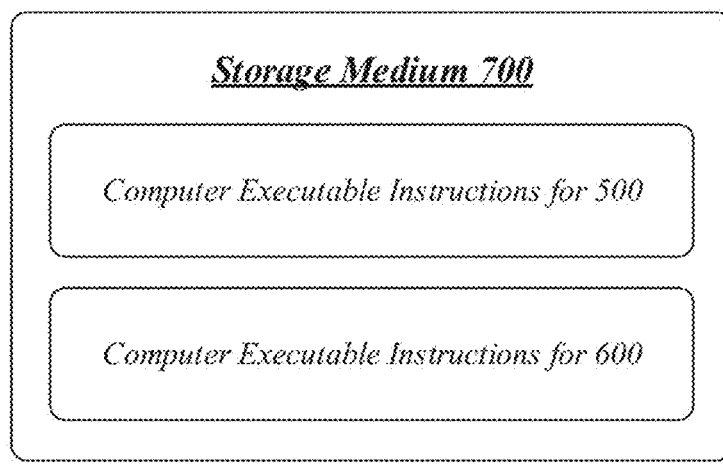
FIG. 7 illustrates an embodiment of a storage medium.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions. In various embodiments, such computer-executable instructions may include computer-executable instructions to implement logic flow 500 of FIG. 5 and/or logic flow 600 of FIG. 6. In some embodiments, such computer-executable instructions may include computer-executable instructions to implement a WCD such as WCD 210 and/or to implement a PRU such as PRU 212. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
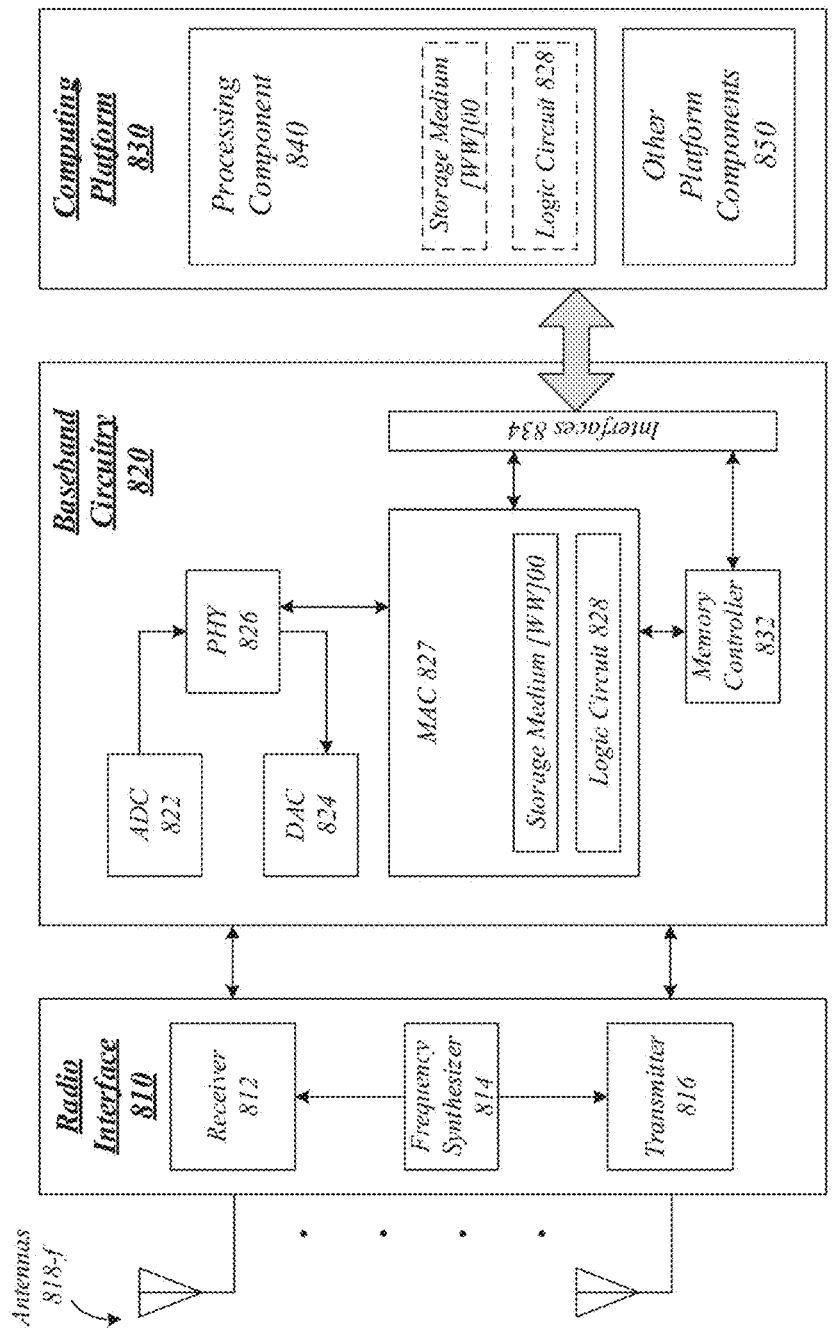
FIG. 8 illustrates an embodiment of a device.

FIG. 8 illustrates an embodiment of a communications device 800 that may implement one or more of wireless charging station 101, PTU 102, WCD 210, PRU 212, logic flow 500, logic flow 600, and storage medium 700. In various embodiments, device 800 may comprise a logic circuit 828. The logic circuit 828 may include physical circuits to perform operations described for one or more of wireless charging station 101, PTU 102, WCD 210, and PRU 212, for example. As shown in FIG. 8, device 800 may include a radio interface 810, baseband circuitry 820, and computing platform 830, although the embodiments are not limited to this configuration.

The device 800 may implement some or all of the structure and/or operations for one or more of wireless charging station 101, PTU 102, WCD 210, PRU 212, logic flow 500, logic flow 600, storage medium 700, and logic circuit 828 in a single computing entity, such as entirely within a single device. Alternatively, the device 800 may distribute portions of the structure and/or operations for one or more of wireless charging station 101, PTU 102, WCD 210, PRU 212, logic flow 500, logic flow 600, storage medium 700, and logic circuit 828 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 810 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 810 may include, for example, a receiver 812, a frequency synthesizer 814, and/or a transmitter 816. Radio interface 810 may include bias controls, a crystal oscillator and/or one or more antennas 818-f. In another embodiment, radio interface 810 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 820 may communicate with radio interface 810 to process receive and/or transmit signals and may include, for example, an analog-to-digital converter 822 for down converting received signals, a digital-to-analog converter 824 for up converting signals for transmission. Further, baseband circuitry 820 may include a baseband or physical layer (PHY) processing circuit 826 for PHY link layer processing of respective receive/transmit signals. Baseband circuitry 820 may include, for example, a medium access control (MAC) processing circuit 827 for MAC/data link layer processing. Baseband circuitry 820 may include a memory controller 832 for communicating with MAC processing circuit 827 and/or a computing platform 830, for example, via one or more interfaces 834.

In some embodiments, PHY processing circuit 826 may include a frame construction and/or detection module, in combination with additional circuitry such as a buffer memory, to construct and/or deconstruct communication frames. Alternatively or in addition, MAC processing circuit 827 may share processing for certain of these functions or perform these processes independent of PHY processing circuit 826. In some embodiments, MAC and PHY processing may be integrated into a single circuit.

The computing platform 830 may provide computing functionality for the device 800. As shown, the computing platform 830 may include a processing component 840. In addition to, or alternatively of, the baseband circuitry 820, the device 800 may execute processing operations or logic for one or more of wireless charging station 101, PTU 102, WCD 210, PRU 212, logic flow 500, logic flow 600, storage medium 700, and logic circuit 828 using the processing component 840. The processing component 840 (and/or PHY 826 and/or MAC 827) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 830 may further include other platform components 850. Other platform components 850 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 800 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 800 described herein, may be included or omitted in various embodiments of device 800, as suitably desired.

Embodiments of device 800 may be implemented using single input single output (SISO) architectures. However, certain implementations may include multiple antennas (e.g., antennas 818-*f*) for transmission and/or reception using adaptive antenna techniques for beamforming or spatial division multiple access (SDMA) and/or using MIMO communication techniques.

The components and features of device 800 may be implemented using any combination of discrete circuitry, application specific integrated circuits (ASICs), logic gates and/or single chip architectures. Further, the features of device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 9:
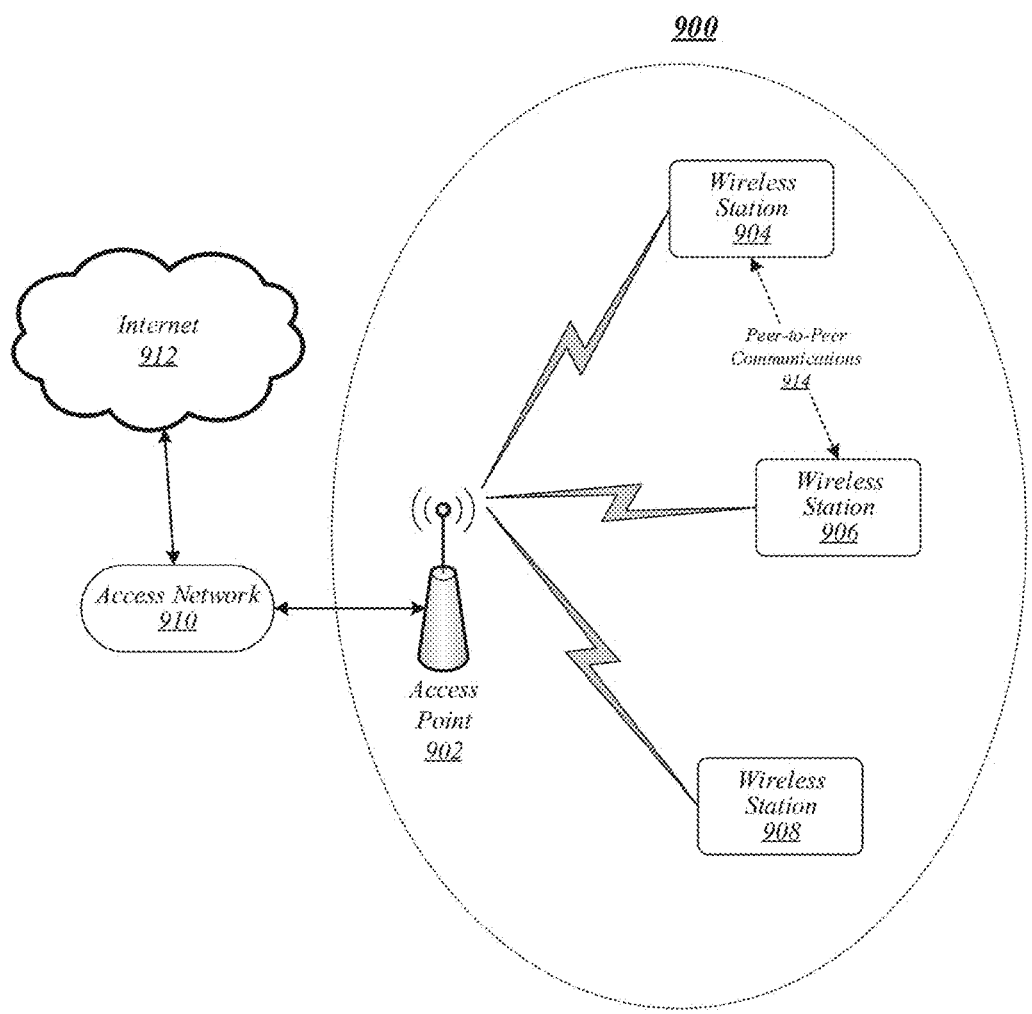
FIG. 9 illustrates an embodiment of a wireless network.

FIG. 9 illustrates an embodiment of a wireless network 900. As shown in FIG. 9, wireless network comprises an access point 902 and wireless stations 904, 906, and 908. In various embodiments, wireless network 900 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 900 may comprise another type of wireless network, and/or may implement other wireless communications standards. In various embodiments, for example, wireless network 900 may comprise a WWAN or WPAN rather than a WLAN. The embodiments are not limited to this example.

In some embodiments, wireless network 900 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1×RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 904, 906, and 908 may communicate with access point 902 in order to obtain connectivity to one or more external data networks. In some embodiments, for example, wireless stations 904, 906, and 908 may connect to the Internet 912 via access point 902 and access network 910. In various embodiments, access network 910 may comprise a private network that provides subscription-based Internet-connectivity, such as an Internet Service Provider (ISP) network. The embodiments are not limited to this example.

In various embodiments, two or more of wireless stations 904, 906, and 908 may communicate with each other directly by exchanging peer-to-peer communications. For example, in the example of FIG. 9, wireless stations 904 and 906 communicate with each other directly by exchanging peer-to-peer communications 914. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising a memory, and logic for a power receiving unit (PRU), at least a portion of the logic implemented in circuitry coupled to the memory, the logic to initiate an operating mode transition to cause the PRU to operate in a charge complete connected (CCC) mode, monitor a rectifier voltage of the PRU to check for power beacons of a power transmitting unit (PTU) during a monitoring interval, and in response to a detection of at least one power beacon during the monitoring interval, determine to maintain a wireless connection with the PTU.

Example 2 is the apparatus of Example 1, the logic to initiate a connection termination procedure to terminate the wireless connection when no power beacon is detected during the monitoring interval.

Example 3 is the apparatus of Example 2, the connection termination procedure to comprise a Generic Access Profile (GAP) Terminate Connection procedure.

Example 4 is the apparatus of any of Examples 1 to 3, the wireless connection to comprise a Bluetooth Low Energy (BLE) connection.

Example 5 is the apparatus of any of Examples 1 to 4, the logic to set a bit of a PRU Static Characteristic associated with the PRU to a value indicating that the PRU is capable of operating in the CCC mode.

Example 6 is the apparatus of Example 5, the bit to be comprised in a PRU Information bit field of the PRU Static Characteristic.

Example 7 is the apparatus of any of Examples 1 to 6, a duration of the monitoring interval to exceed a duration of a time interval between long beacons of the PTU.

Example 8 is the apparatus of Example 7, the time interval between long beacons of the PTU to comprise a duration within a range of 1000-3000 ms, inclusive.

Example 9 is the apparatus of any of Examples 1 to 8, the logic to determine, during operation of the PRU in the CCC mode, whether power is required at the PRU, and in response to a determination that power is required at the PRU, generate a power transfer request for transmission to the PTU.

Example 10 is the apparatus of Example 9, the generation of the power transfer request to include setting a Charge Complete bit to a value of 0.

Example 11 is the apparatus of Example 10, the Charge Complete bit to be comprised in a PRU Dynamic Parameter Characteristic associated with the PRU.

Example 12 is the apparatus of Example 10, the Charge Complete bit to be comprised in a PRU Alert.

Example 13 is the apparatus of any of Examples 9 to 12, the logic to initiate a connection termination procedure to terminate the wireless connection in response to a determination, upon an expiration of a wait interval following a transmission of the power transfer request, that no power availability notification has been received from the PTU.

Example 14 is the apparatus of Example 13, the connection termination procedure to comprise a Generic Access Profile (GAP) Terminate Connection procedure.

Example 15 is the apparatus of any of Examples 9 to 12, the logic to determine to maintain the wireless connection based on receipt of a power availability notification from the PTU during a wait interval following a transmission of the power transfer request.

Example 16 is the apparatus of Example 15, the wait interval to comprise a duration of 0.5 seconds.

Example 17 is the apparatus of Example 15, the wait interval to comprise a duration of 1.0 seconds.

Example 18 is the apparatus of any of Examples 15 to 17, the logic to transition the PRU to an on state in response to receipt of the power availability notification.

Example 19 is the apparatus of Example 18, the logic to transition the PRU from a boot state to the on state.

Example 20 is the apparatus of any of Examples 15 to 19, the power availability notification to comprise a PRU Control message.

Example 21 is the apparatus of Example 20, the PRU Control message to include a PRU Charge Port field comprising a value of 1.

Example 22 is the apparatus of any of Examples 20 to 21, the PRU Control message to include a Permission field comprising a value of '0000 0000'.

Example 23 is a system, comprising an apparatus according to any of Examples 1 to 22, and at least one radio frequency (RF) transceiver.

Example 24 is the system of Example 23, comprising at least one RF antenna.

Example 25 is the system of any of Examples 23 to 24, comprising at least one processor.

Example 26 is an apparatus, comprising a memory, and logic for a power transmitting unit (PTU), at least a portion of the logic implemented in circuitry coupled to the memory, the logic to detect, during operation of the PTU in a power save state, a power transfer request of a charge complete connected mode (CCC-mode) power receiving unit (PRU), determine whether the PTU can provide power to the CCC-mode PRU, and in response to a determination that the PTU can provide power to the CCC-mode PRU, transition the PTU to a power transfer state and generate a power availability notification for transmission to the CCC-mode PRU.

Example 27 is the apparatus of Example 26, the logic to determine to maintain the power save state in response to a determination that the PTU cannot provide power to the CCC-mode PRU.

Example 28 is the apparatus of any of Examples 26 to 27, the power availability notification to comprise a PRU Control message.

Example 29 is the apparatus of any of Examples 26 to 28, the logic to enable a charge port in response to the determination that the PTU can provide power to the CCC-mode PRU.

Example 30 is the apparatus of Example 29, the power availability notification to indicate the enablement of the charge port.

Example 31 is the apparatus of Example 30, the power availability notification to include a PRU Charge Port field comprising a value indicating the enablement of the charge port.

Example 32 is the apparatus of any of Examples 26 to 31, the power availability notification to include a Permission field comprising a value of '0000 0000'.

Example 33 is the apparatus of any of Examples 26 to 32, the logic to determine that the CCC-mode PRU is capable of operating according to the charge complete connected mode based on a value of a bit of a PRU Static Characteristic associated with the CCC-mode PRU.

Example 34 is the apparatus of Example 33, the bit to be comprised in a PRU Information bit field of the PRU Static Characteristic.

Example 35 is the apparatus of any of Examples 26 to 34, the power transfer request to contain a Charge Complete bit comprising a value of 0.

Example 36 is the apparatus of any of Examples 26 to 35, the power transfer request to comprise a PRU Dynamic Parameter Characteristic associated with the CCC-mode PRU.

Example 37 is the apparatus of any of Examples 26 to 35, the power transfer request to comprise a PRU Alert.

Example 38 is the apparatus of any of Examples 26 to 37, the logic to initiate the operation in the power save state based on receipt of a charge completion notification from the CCC-mode PRU.

Example 39 is the apparatus of Example 38, the charge completion notification to comprise a Charge Complete bit comprising a value of 1.

Example 40 is the apparatus of any of Examples 38 to 39, the charge completion notification to comprise a PRU Dynamic Parameter Characteristic associated with the CCC-mode PRU.

Example 41 is the apparatus of any of Examples 38 to 39, the charge completion notification to comprise a PRU Alert.

Example 42 is the apparatus of any of Examples 26 to 41, the power transfer request to be received via a Bluetooth Low Energy (BLE) connection with the CCC-mode PRU.

Example 43 is a system, comprising an apparatus according to any of Examples 26 to 42, and at least one radio frequency (RF) transceiver.

Example 44 is the system of Example 43, comprising at least one RF antenna.

Example 45 is the system of any of Examples 43 to 44, comprising at least one processor.

Example 46 is at least one non-transitory computer-readable storage medium comprising a set of instructions that, in response to being executed at a power receiving unit (PRU), cause the PRU to initiate an operating mode transition to transition to a charge complete connected (CCC) mode, monitor a rectifier voltage of the PRU to check for power beacons of a power transmitting unit (PTU) during a monitoring interval, and in response to a detection of at least one power beacon during the monitoring interval, determine to maintain a wireless connection with the PTU.

Example 47 is the at least one non-transitory computer-readable storage medium of Example 46, comprising instructions that, in response to being executed at the PRU, cause the PRU to initiate a connection termination procedure to terminate the wireless connection when no power beacon is detected during the monitoring interval.

Example 48 is the at least one non-transitory computer-readable storage medium of Example 47, the connection termination procedure to comprise a Generic Access Profile (GAP) Terminate Connection procedure.

Example 49 is the at least one non-transitory computer-readable storage medium of any of Examples 46 to 48, the wireless connection to comprise a Bluetooth Low Energy (BLE) connection.

Example 50 is the at least one non-transitory computer-readable storage medium of any of Examples 46 to 49, comprising instructions that, in response to being executed at the PRU, cause the PRU to set a bit of a PRU Static Characteristic associated with the PRU to a value indicating that the PRU is capable of operating in the CCC mode.

Example 51 is the at least one non-transitory computer-readable storage medium of Example 50, the bit to be comprised in a PRU Information bit field of the PRU Static Characteristic.

Example 52 is the at least one non-transitory computer-readable storage medium of any of Examples 46 to 51, a duration of the monitoring interval to exceed a duration of a time interval between long beacons of the PTU.

Example 53 is the at least one non-transitory computer-readable storage medium of Example 52, the time interval between long beacons of the PTU to comprise a duration within a range of 1000-3000 ms, inclusive.

Example 54 is the at least one non-transitory computer-readable storage medium of any of Examples 46 to 53, comprising instructions that, in response to being executed at the PRU, cause the PRU to determine, during operation in the CCC mode, whether power is required at the PRU, and in response to a determination that power is required at the PRU, generate a power transfer request for transmission to the PTU.

Example 55 is the at least one non-transitory computer-readable storage medium of Example 54, the generation of the power transfer request to include setting a Charge Complete bit to a value of 0.

Example 56 is the at least one non-transitory computer-readable storage medium of Example 55, the Charge Complete bit to be comprised in a PRU Dynamic Parameter Characteristic associated with the PRU.

Example 57 is the at least one non-transitory computer-readable storage medium of Example 55, the Charge Complete bit to be comprised in a PRU Alert.

Example 58 is the at least one non-transitory computer-readable storage medium of any of Examples 54 to 57, comprising instructions that, in response to being executed at the PRU, cause the PRU to initiate a connection termination procedure to terminate the wireless connection in response to a determination, upon an expiration of a wait interval following a transmission of the power transfer request, that no power availability notification has been received from the PTU.

Example 59 is the at least one non-transitory computer-readable storage medium of Example 58, the connection termination procedure to comprise a Generic Access Profile (GAP) Terminate Connection procedure.

Example 60 is the at least one non-transitory computer-readable storage medium of any of Examples 54 to 57, comprising instructions that, in response to being executed at the PRU, cause the PRU to determine to maintain the wireless connection based on receipt of a power availability notification from the PTU during a wait interval following a transmission of the power transfer request.

Example 61 is the at least one non-transitory computer-readable storage medium of Example 60, the wait interval to comprise a duration of 0.5 seconds.

Example 62 is the at least one non-transitory computer-readable storage medium of Example 60, the wait interval to comprise a duration of 1.0 seconds.

Example 63 is the at least one non-transitory computer-readable storage medium of any of Examples 60 to 62, comprising instructions that, in response to being executed at the PRU, cause the PRU to transition to an on state in response to receipt of the power availability notification.

Example 64 is the at least one non-transitory computer-readable storage medium of Example 63, comprising instructions that, in response to being executed at the PRU, cause the PRU to transition from a boot state to the on state.

Example 65 is the at least one non-transitory computer-readable storage medium of any of Examples 60 to 64, the power availability notification to comprise a PRU Control message.

Example 66 is the at least one non-transitory computer-readable storage medium of Example 65, the PRU Control message to include a PRU Charge Port field comprising a value of 1.

Example 67 is the at least one non-transitory computer-readable storage medium of any of Examples 65 to 66, the PRU Control message to include a Permission field comprising a value of '0000 0000'.

Example 68 is at least one non-transitory computer-readable storage medium comprising a set of instructions that, in response to being executed at a power transmitting unit (PTU), cause the PTU to detect, during operation in a power save state, a power transfer request of a charge complete connected mode (CCC-mode) power receiving unit (PRU), determine whether the PTU can provide power to the CCC-mode PRU, and in response to a determination that the PTU can provide power to the CCC-mode PRU, transition to a power transfer state and generate a power availability notification for transmission to the CCC-mode PRU.

Example 69 is the at least one non-transitory computer-readable storage medium of Example 68, comprising instructions that, in response to being executed at the PTU, cause the PTU to determine to maintain the power save state in response to a determination that the PTU cannot provide power to the CCC-mode PRU.

Example 70 is the at least one non-transitory computer-readable storage medium of any of Examples 68 to 69, the power availability notification to comprise a PRU Control message.

Example 71 is the at least one non-transitory computer-readable storage medium of any of Examples 68 to 70, comprising instructions that, in response to being executed at the PTU, cause the PTU to enable a charge port in response to the determination that the PTU can provide power to the CCC-mode PRU.

Example 72 is the at least one non-transitory computer-readable storage medium of Example 71, the power availability notification to indicate the enablement of the charge port.

Example 73 is the at least one non-transitory computer-readable storage medium of Example 72, the power availability notification to include a PRU Charge Port field comprising a value indicating the enablement of the charge port.

Example 74 is the at least one non-transitory computer-readable storage medium of any of Examples 68 to 73, the power availability notification to include a Permission field comprising a value of '0000 0000'.

Example 75 is the at least one non-transitory computer-readable storage medium of any of Examples 68 to 74, comprising instructions that, in response to being executed at the PTU, cause the PTU to determine that the CCC-mode PRU is capable of operating according to the charge complete connected mode based on a value of a bit of a PRU Static Characteristic associated with the CCC-mode PRU.

Example 76 is the at least one non-transitory computer-readable storage medium of Example 75, the bit to be comprised in a PRU Information bit field of the PRU Static Characteristic.

Example 77 is the at least one non-transitory computer-readable storage medium of any of Examples 68 to 76, the power transfer request to contain a Charge Complete bit comprising a value of 0.

Example 78 is the at least one non-transitory computer-readable storage medium of any of Examples 68 to 77, the power transfer request to comprise a PRU Dynamic Parameter Characteristic associated with the CCC-mode PRU.

Example 79 is the at least one non-transitory computer-readable storage medium of any of Examples 68 to 77, the power transfer request to comprise a PRU Alert.

Example 80 is the at least one non-transitory computer-readable storage medium of any of Examples 68 to 79, comprising instructions that, in response to being executed at the PTU, cause the PTU to initiate the operation in the power save state based on receipt of a charge completion notification from the CCC-mode PRU.

Example 81 is the at least one non-transitory computer-readable storage medium of Example 80, the charge completion notification to comprise a Charge Complete bit comprising a value of 1.

Example 82 is the at least one non-transitory computer-readable storage medium of any of Examples 80 to 81, the charge completion notification to comprise a PRU Dynamic Parameter Characteristic associated with the CCC-mode PRU.

Example 83 is the at least one non-transitory computer-readable storage medium of any of Examples 80 to 81, the charge completion notification to comprise a PRU Alert.

Example 84 is the at least one non-transitory computer-readable storage medium of any of Examples 68 to 83, the power transfer request to be received via a Bluetooth Low Energy (BLE) connection with the CCC-mode PRU.

Example 85 is a method, comprising initiating an operating mode transition to cause a power receiving unit (PRU) to operate in a charge complete connected (CCC) mode, monitoring a rectifier voltage of the PRU to check for power beacons of a power transmitting unit (PTU) during a monitoring interval, and in response to a detection of at least one power beacon during the monitoring interval, determining to maintain a wireless connection with the PTU.

Example 86 is the method of Example 85, comprising initiating a connection termination procedure to terminate the wireless connection when no power beacon is detected during the monitoring interval.

Example 87 is the method of Example 86, the connection termination procedure to comprise a Generic Access Profile (GAP) Terminate Connection procedure.

Example 88 is the method of any of Examples 85 to 87, the wireless connection to comprise a Bluetooth Low Energy (BLE) connection.

Example 89 is the method of any of Examples 85 to 88, comprising setting a bit of a PRU Static Characteristic associated with the PRU to a value indicating that the PRU is capable of operating in the CCC mode.

Example 90 is the method of Example 89, the bit to be comprised in a PRU Information bit field of the PRU Static Characteristic.

Example 91 is the method of any of Examples 85 to 90, a duration of the monitoring interval to exceed a duration of a time interval between long beacons of the PTU.

Example 92 is the method of Example 91, the time interval between long beacons of the PTU to comprise a duration within a range of 1000-3000 ms, inclusive.

Example 93 is the method of any of Examples 85 to 92, comprising determining, during operation of the PRU in the CCC mode, whether power is required at the PRU, and in response to a determination that power is required at the PRU, generating a power transfer request for transmission to the PTU.

Example 94 is the method of Example 93, the generation of the power transfer request to include setting a Charge Complete bit to a value of 0.

Example 95 is the method of Example 94, the Charge Complete bit to be comprised in a PRU Dynamic Parameter Characteristic associated with the PRU.

Example 96 is the method of Example 94, the Charge Complete bit to be comprised in a PRU Alert.

Example 97 is the method of any of Examples 93 to 96, comprising initiating a connection termination procedure to terminate the wireless connection in response to a determination, upon an expiration of a wait interval following a transmission of the power transfer request, that no power availability notification has been received from the PTU.

Example 98 is the method of Example 97, the connection termination procedure to comprise a Generic Access Profile (GAP) Terminate Connection procedure.

Example 99 is the method of any of Examples 93 to 96, comprising determining to maintain the wireless connection based on receipt of a power availability notification from the PTU during a wait interval following a transmission of the power transfer request.

Example 100 is the method of Example 99, the wait interval to comprise a duration of 0.5 seconds.

Example 101 is the method of Example 99, the wait interval to comprise a duration of 1.0 seconds.

Example 102 is the method of any of Examples 99 to 101, comprising transitioning the PRU to an on state in response to receipt of the power availability notification.

Example 103 is the method of Example 102, comprising transitioning the PRU from a boot state to the on state.

Example 104 is the method of any of Examples 99 to 103, the power availability notification to comprise a PRU Control message.

Example 105 is the method of Example 104, the PRU Control message to include a PRU Charge Port field comprising a value of 1.

Example 106 is the method of any of Examples 104 to 105, the PRU Control message to include a Permission field comprising a value of '0000 0000'.

Example 107 is at least one non-transitory computer-readable storage medium comprising a set of instructions that, in response to being executed on a computing device, cause the computing device to perform a method according to any of Examples 85 to 106.

Example 108 is an apparatus, comprising means for performing a method according to any of Examples 85 to 106.

Example 109 is a system, comprising the apparatus of Example 108, and at least one radio frequency (RF) transceiver.

Example 110 is the system of Example 109, comprising at least one RF antenna.

Example 111 is the system of any of Examples 109 to 110, comprising at least one processor.

Example 112 is a method, comprising detecting, during operation of a power transmitting unit (PTU) in a power save state, a power transfer request of a charge complete connected mode (CCC-mode) power receiving unit (PRU), determining whether the PTU can provide power to the CCC-mode PRU, and in response to a determination that the PTU can provide power to the CCC-mode PRU, transitioning the PTU to a power transfer state and generating a power availability notification for transmission to the CCC-mode PRU.

Example 113 is the method of Example 112, comprising determining to maintain the power save state in response to a determination that the PTU cannot provide power to the CCC-mode PRU.

Example 114 is the method of any of Examples 112 to 113, the power availability notification to comprise a PRU Control message.

Example 115 is the method of any of Examples 112 to 114, comprising enabling a charge port in response to the determination that the PTU can provide power to the CCC-mode PRU.

Example 116 is the method of Example 115, the power availability notification to indicate the enablement of the charge port.

Example 117 is the method of Example 116, the power availability notification to include a PRU Charge Port field comprising a value indicating the enablement of the charge port.

Example 118 is the method of any of Examples 112 to 117, the power availability notification to include a Permission field comprising a value of '0000 0000'.

Example 119 is the method of any of Examples 112 to 118, comprising determining that the CCC-mode PRU is capable of operating according to the charge complete connected mode based on a value of a bit of a PRU Static Characteristic associated with the CCC-mode PRU.

Example 120 is the method of Example 119, the bit to be comprised in a PRU Information bit field of the PRU Static Characteristic.

Example 121 is the method of any of Examples 112 to 120, the power transfer request to contain a Charge Complete bit comprising a value of 0.

Example 122 is the method of any of Examples 112 to 121, the power transfer request to comprise a PRU Dynamic Parameter Characteristic associated with the CCC-mode PRU.

Example 123 is the method of any of Examples 112 to 121, the power transfer request to comprise a PRU Alert.

Example 124 is the method of any of Examples 112 to 123, comprising initiating the operation in the power save state based on receipt of a charge completion notification from the CCC-mode PRU.

Example 125 is the method of Example 124, the charge completion notification to comprise a Charge Complete bit comprising a value of 1.

Example 126 is the method of any of Examples 124 to 125, the charge completion notification to comprise a PRU Dynamic Parameter Characteristic associated with the CCC-mode PRU.

Example 127 is the method of any of Examples 124 to 125, the charge completion notification to comprise a PRU Alert.

Example 128 is the method of any of Examples 112 to 127, the power transfer request to be received via a Bluetooth Low Energy (BLE) connection with the CCC-mode PRU.

Example 129 is at least one non-transitory computer-readable storage medium comprising a set of instructions that, in response to being executed on a computing device, cause the computing device to perform a method according to any of Examples 112 to 128.

Example 130 is an apparatus, comprising means for performing a method according to any of Examples 112 to 128.

Example 131 is a system, comprising the apparatus of Example 130, and at least one radio frequency (RF) transceiver.

Example 132 is the system of Example 131, comprising at least one RF antenna.

Example 133 is the system of any of Examples 131 to 132, comprising at least one processor.

Example 134 is an apparatus, comprising means for initiating an operating mode transition to cause a power receiving unit (PRU) to operate in a charge complete connected (CCC) mode, means for monitoring a rectifier voltage of the PRU to check for power beacons of a power transmitting unit (PTU) during a monitoring interval, and means for determining to maintain a wireless connection with the PTU in response to a detection of at least one power beacon during the monitoring interval.

Example 135 is the apparatus of Example 134, comprising means for initiating a connection termination procedure to terminate the wireless connection when no power beacon is detected during the monitoring interval.

Example 136 is the apparatus of Example 135, the connection termination procedure to comprise a Generic Access Profile (GAP) Terminate Connection procedure.

Example 137 is the apparatus of any of Examples 134 to 136, the wireless connection to comprise a Bluetooth Low Energy (BLE) connection.

Example 138 is the apparatus of any of Examples 134 to 137, comprising means for setting a bit of a PRU Static Characteristic associated with the PRU to a value indicating that the PRU is capable of operating in the CCC mode.

Example 139 is the apparatus of Example 138, the bit to be comprised in a PRU Information bit field of the PRU Static Characteristic.

Example 140 is the apparatus of any of Examples 134 to 139, a duration of the monitoring interval to exceed a duration of a time interval between long beacons of the PTU.

Example 141 is the apparatus of Example 140, the time interval between long beacons of the PTU to comprise a duration within a range of 1000-3000 ms, inclusive.

Example 142 is the apparatus of any of Examples 134 to 141, comprising means for determining, during operation of the PRU in the CCC mode, whether power is required at the PRU, and means for generating a power transfer request for transmission to the PTU in response to a determination that power is required at the PRU.

Example 143 is the apparatus of Example 142, the generation of the power transfer request to include setting a Charge Complete bit to a value of 0.

Example 144 is the apparatus of Example 143, the Charge Complete bit to be comprised in a PRU Dynamic Parameter Characteristic associated with the PRU.

Example 145 is the apparatus of Example 143, the Charge Complete bit to be comprised in a PRU Alert.

Example 146 is the apparatus of any of Examples 142 to 145, comprising means for initiating a connection termination procedure to terminate the wireless connection in response to a determination, upon an expiration of a wait interval following a transmission of the power transfer request, that no power availability notification has been received from the PTU.

Example 147 is the apparatus of Example 146, the connection termination procedure to comprise a Generic Access Profile (GAP) Terminate Connection procedure.

Example 148 is the apparatus of any of Examples 142 to 145, comprising means for determining to maintain the wireless connection based on receipt of a power availability notification from the PTU during a wait interval following a transmission of the power transfer request.

Example 149 is the apparatus of Example 148, the wait interval to comprise a duration of 0.5 seconds.

Example 150 is the apparatus of Example 148, the wait interval to comprise a duration of 1.0 seconds.

Example 151 is the apparatus of any of Examples 148 to 150, comprising means for transitioning the PRU to an on state in response to receipt of the power availability notification.

Example 152 is the apparatus of Example 151, comprising means for transitioning the PRU from a boot state to the on state.

Example 153 is the apparatus of any of Examples 148 to 152, the power availability notification to comprise a PRU Control message.

Example 154 is the apparatus of Example 153, the PRU Control message to include a PRU Charge Port field comprising a value of 1.

Example 155 is the apparatus of any of Examples 153 to 154, the PRU Control message to include a Permission field comprising a value of '0000 0000'.

Example 156 is a system, comprising an apparatus according to any of Examples 134 to 155, and at least one radio frequency (RF) transceiver.

Example 157 is the system of Example 156, comprising at least one RF antenna.

Example 158 is the system of any of Examples 156 to 157, comprising at least one processor.

Example 159 is an apparatus, comprising means for detecting, during operation of a power transmitting unit (PTU) in a power save state, a power transfer request of a charge complete connected mode (CCC-mode) power receiving unit (PRU), means for determining whether the PTU can provide power to the CCC-mode PRU, and means for transitioning the PTU to a power transfer state and generating a power availability notification for transmission to the CCC-mode PRU in response to a determination that the PTU can provide power to the CCC-mode PRU.

Example 160 is the apparatus of Example 159, comprising means for determining to maintain the power save state in response to a determination that the PTU cannot provide power to the CCC-mode PRU.

Example 161 is the apparatus of any of Examples 159 to 160, the power availability notification to comprise a PRU Control message.

Example 162 is the apparatus of any of Examples 159 to 161, comprising means for enabling a charge port in response to the determination that the PTU can provide power to the CCC-mode PRU.

Example 163 is the apparatus of Example 162, the power availability notification to indicate the enablement of the charge port.

Example 164 is the apparatus of Example 163, the power availability notification to include a PRU Charge Port field comprising a value indicating the enablement of the charge port.

Example 165 is the apparatus of any of Examples 159 to 164, the power availability notification to include a Permission field comprising a value of '0000 0000'.

Example 166 is the apparatus of any of Examples 159 to 165, comprising means for determining that the CCC-mode PRU is capable of operating according to the charge complete connected mode based on a value of a bit of a PRU Static Characteristic associated with the CCC-mode PRU.

Example 167 is the apparatus of Example 166, the bit to be comprised in a PRU Information bit field of the PRU Static Characteristic.

Example 168 is the apparatus of any of Examples 159 to 167, the power transfer request to contain a Charge Complete bit comprising a value of 0.

Example 169 is the apparatus of any of Examples 159 to 168, the power transfer request to comprise a PRU Dynamic Parameter Characteristic associated with the CCC-mode PRU.

Example 170 is the apparatus of any of Examples 159 to 168, the power transfer request to comprise a PRU Alert.

Example 171 is the apparatus of any of Examples 159 to 170, comprising means for initiating the operation in the power save state based on receipt of a charge completion notification from the CCC-mode PRU.

Example 172 is the apparatus of Example 171, the charge completion notification to comprise a Charge Complete bit comprising a value of 1.

Example 173 is the apparatus of any of Examples 171 to 172, the charge completion notification to comprise a PRU Dynamic Parameter Characteristic associated with the CCC-mode PRU.

Example 174 is the apparatus of any of Examples 171 to 172, the charge completion notification to comprise a PRU Alert.

Example 175 is the apparatus of any of Examples 159 to 174, the power transfer request to be received via a Bluetooth Low Energy (BLE) connection with the CCC-mode PRU.

Example 176 is a system, comprising an apparatus according to any of Examples 159 to 175, and at least one radio frequency (RF) transceiver.

Example 177 is the system of Example 176, comprising at least one RF antenna.

Example 178 is the system of any of Examples 176 to 177, comprising at least one processor.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a memory; and
   logic for a power receiving unit (PRU), at least a portion of the logic implemented in circuitry coupled to the memory, the logic to:
      initiate an operating mode transition to cause the PRU to operate in a charge complete connected (CCC) mode;
      monitor a rectifier voltage of the PRU to check for power beacons of a power transmitting unit (PTU) during a monitoring interval; and
      in response to a detection of at least one power beacon during the monitoring interval, determine to maintain a wireless connection with the PTU.

2. The apparatus of claim 1, the logic to initiate a connection termination procedure to terminate the wireless connection when no power beacon is detected during the monitoring interval.

3. The apparatus of claim 1, a duration of the monitoring interval to exceed a duration of a time interval between long beacons of the PTU.

4. The apparatus of claim 1, the logic to:
   determine, during operation of the PRU in the CCC mode, whether power is required at the PRU; and
   in response to a determination that power is required at the PRU, generate a power transfer request for transmission to the PTU.

5. The apparatus of claim 4, the logic to initiate a connection termination procedure to terminate the wireless connection in response to a determination, upon an expiration of a wait interval following a transmission of the power transfer request, that no power availability notification has been received from the PTU.

6. The apparatus of claim 4, the logic to determine to maintain the wireless connection based on receipt of a power availability notification from the PTU during a wait interval following a transmission of the power transfer request.

7. A system, comprising:
   the apparatus of claim 1;
   at least one radio frequency (RF) transceiver; and
   at least one RF antenna.

8. At least one non-transitory computer-readable storage medium comprising a set of instructions that, in response to being executed at a power receiving unit (PRU), cause the PRU to:
   initiate an operating mode transition to transition to a charge complete connected (CCC) mode;

monitor a rectifier voltage of the PRU to check for power beacons of a power transmitting unit (PTU) during a monitoring interval; and in response to a detection of at least one power beacon during the monitoring interval, determine to maintain a wireless connection with the PTU.

9. The at least one non-transitory computer-readable storage medium of claim 8, comprising instructions that, in response to being executed at the PRU, cause the PRU to initiate a connection termination procedure to terminate the wireless connection when no power beacon is detected during the monitoring interval.

10. The at least one non-transitory computer-readable storage medium of claim 8, a duration of the monitoring interval to exceed a duration of a time interval between long beacons of the PTU.

11. The at least one non-transitory computer-readable storage medium of claim 8, comprising instructions that, in response to being executed at the PRU, cause the PRU to:
determine, during operation in the CCC mode, whether power is required at the PRU; and
in response to a determination that power is required at the PRU, generate a power transfer request for transmission to the PTU.

12. The at least one non-transitory computer-readable storage medium of claim 11, comprising instructions that, in response to being executed at the PRU, cause the PRU to initiate a connection termination procedure to terminate the wireless connection in response to a determination, upon an expiration of a wait interval following a transmission of the power transfer request, that no power availability notification has been received from the PTU.

13. The at least one non-transitory computer-readable storage medium of claim 11, comprising instructions that, in response to being executed at the PRU, cause the PRU to determine to maintain the wireless connection based on receipt of a power availability notification from the PTU during a wait interval following a transmission of the power transfer request.

\* \* \* \* \*